United States Patent [19]

Walter

[11] 4,042,192
[45] Aug. 16, 1977

[54] BALLOON WITH DEFLATION AND MANEUVERING PORTS

[76] Inventor: Forrest L. Walter, S. 4323 Locust Road, Spokane, Wash. 99206

[21] Appl. No.: 707,770

[22] Filed: July 19, 1976

[51] Int. Cl.² ............................................. B64B 1/62
[52] U.S. Cl. ................................... 244/99; 244/152
[58] Field of Search ................................. 244/30–33, 244/96–99, 145, 152; 251/DIG. 2

[56] References Cited

U.S. PATENT DOCUMENTS

| | | | |
|---|---|---|---|
| 1,013,075 | 12/1911 | Scott | 251/DIG. 2 |
| 1,078,455 | 11/1913 | Myers | 244/99 X |
| 2,116,037 | 5/1938 | Nonake | 244/152 |
| 3,131,889 | 5/1964 | Yost | 244/31 |
| 3,228,636 | 1/1966 | Lemoigne | 244/152 X |
| 3,534,927 | 10/1970 | Harding | 244/31 |
| 3,860,201 | 1/1975 | Hall | 244/99 |

FOREIGN PATENT DOCUMENTS 499,888  5/1930  Germany ........................ 244/99

Primary Examiner—Trygve M. Blix
Assistant Examiner—Barefoot Galen L.
Attorney, Agent, or Firm—Hill, Gross, Simpson, Van Santen, Steadman, Chiara & Simpson

[57] ABSTRACT

A hot air balloon with an adjustable deflation port at its upper end and a maneuvering port on a side region which allows both ports to be selectively opened and closed on the ground and during flight such that positive control of such ports exist by the operator of the balloon in the basket.

3 Claims, 8 Drawing Figures

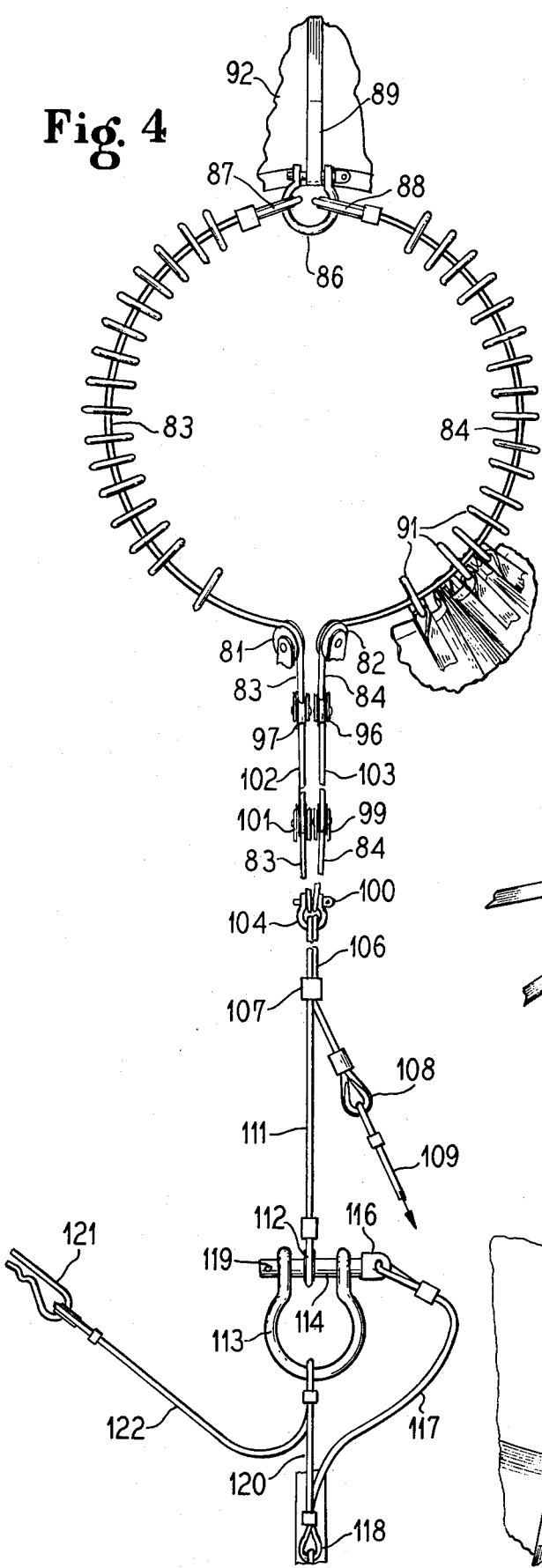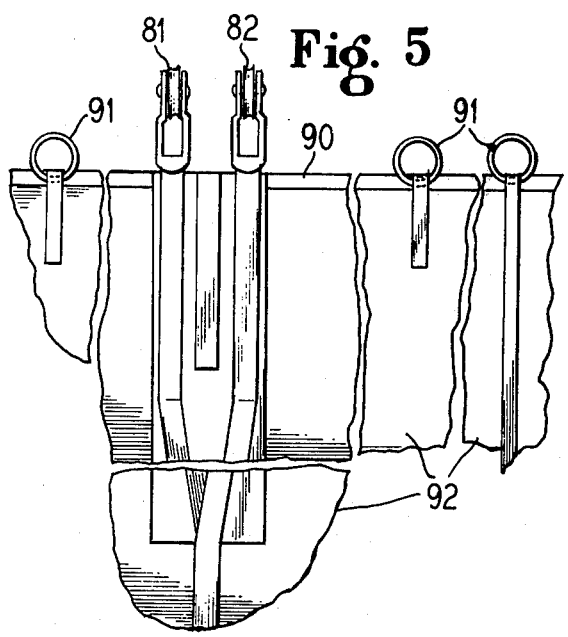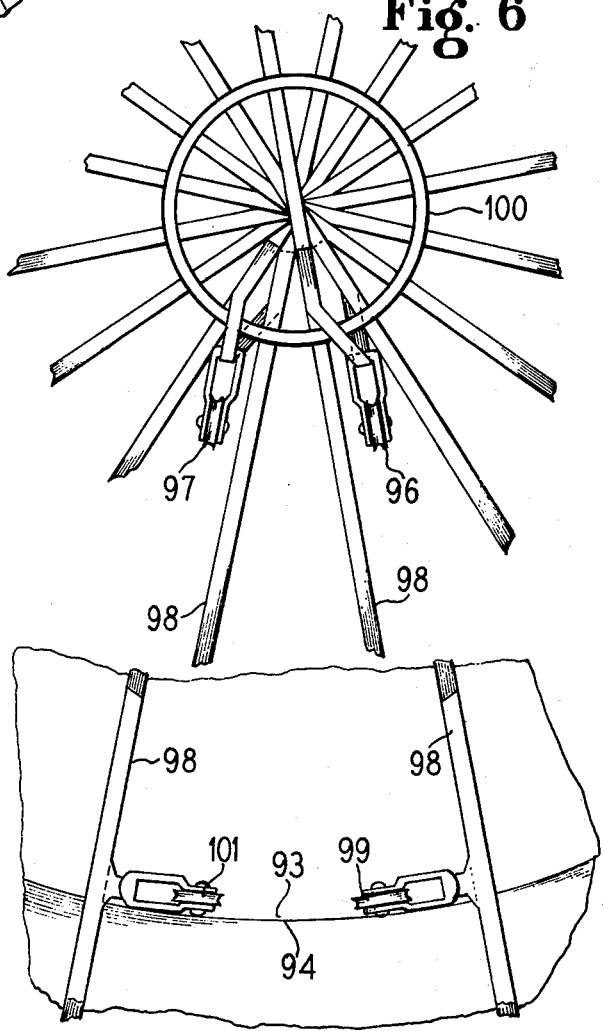

4,042,192

BALLOON WITH DEFLATION AND MANEUVERING PORTS

BACKGROUND OF THE INVENTION

1. Field of the Invention

This invention relates in general to hot air balloons and in particular to an improved balloon having adjustable deflation and maneuvering ports.

2. Description of the Prior Art

As hot air balloons have become more and more popular, they have been constructed with heaters beneath their lower opening so as to heat the air within the balloon envelope. It is necessary and desirable when the balloon lands to rapidly deflate the balloon so that the envelope will rapidly collapse thus preventing it from being blown across the ground by the wind. It is also desirable to have a maneuvering port on a side panel of the balloon for maneuvering the craft while in the air.

Prior art deflation ports have provided detachable panels which once released so as to deflate or maneuver the balloon cannot subsequently be closed in flight and thus if the deflation port accidentally is opened during flight the balloon may collapse and descend at dangerous and fatal velocities.

Deflation ports of the prior art have occasionally opened accidentally while in flight resulting in casualties to the pastures in the balloon.

SUMMARY OF THE INVENTION

The present invention relates to a hot air balloon having deflation and maneuvering ports which can be selectively opened and closed and adjusted to varying positions from the basket of the balloon while in flight as well as when the balloon is on the ground. The deflation port comprises a draw string arrangement connected to suitable lines such that the deflation port can be rapidly opened by pulling a quick disconnect pin or alternatively by manually releasing a line and alternatively the deflation port can be closed by pulling on the control line by the operator. The deflation port may be opened varying amounts such that it is one quarter, half, three quarter opened as well as being completely opened or closed. A maneuvering port is controllable from the basket and can be selectively opened and closed by the operator as well as being opened and closed varying amounts. The result is a balloon which is much more maneuverable and safer than those of the prior art in that it is impossible for the balloon envelope to collapse upon accidental opening of the deflation port since in the event such port is accidentally opened the operator can manually close such port before the envelope collapses.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIg. 4 is a plan view of the control system for the deflation port;

FIG. 5 is an enlarged detail view illustrating the control pulleys and rings of the deflation port;

FIG. 6 is a plan view of the webbing structure of the top of the balloon;

DESCRIPTION OF THE PREFERRED EMBODIMENTS

Figure 1:
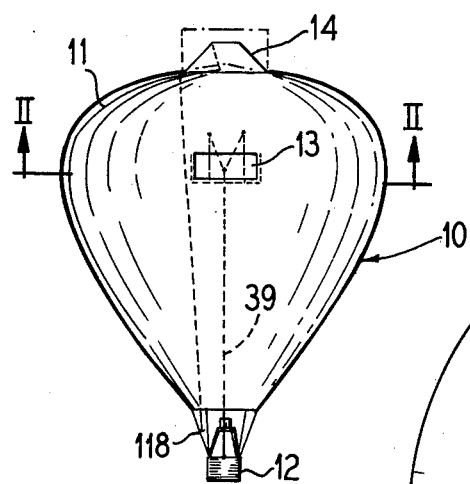
FIG. 1 is a side plan view of the balloon of the invention.

FIG. 1 illustrates a balloon 10 of the invention comprising an envelope 11 and a basket supported therefrom. An adjustable deflation port 14 is formed in the upper end of the balloon and a maneuvering port 13 is formed in a side portion of the balloon.

Figure 2:
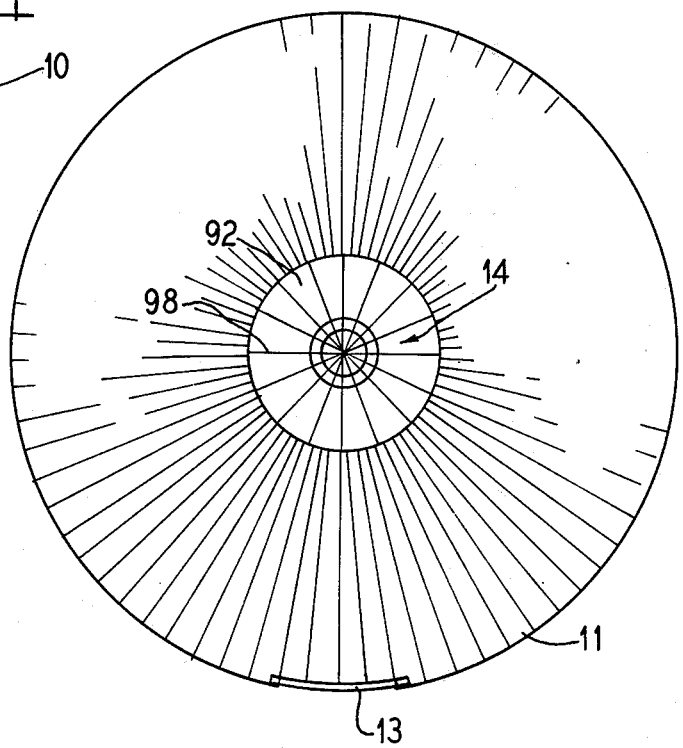
FIG. 2 is a top plan view of the invention.

FIG. 2 is a top plan view illustrating the balloon envelope 11 and the adjustable deflation port 14 which comprises an adjustable member 92 and underlying webbing 98 which comprises the structural members of the balloon.

Figure 3:
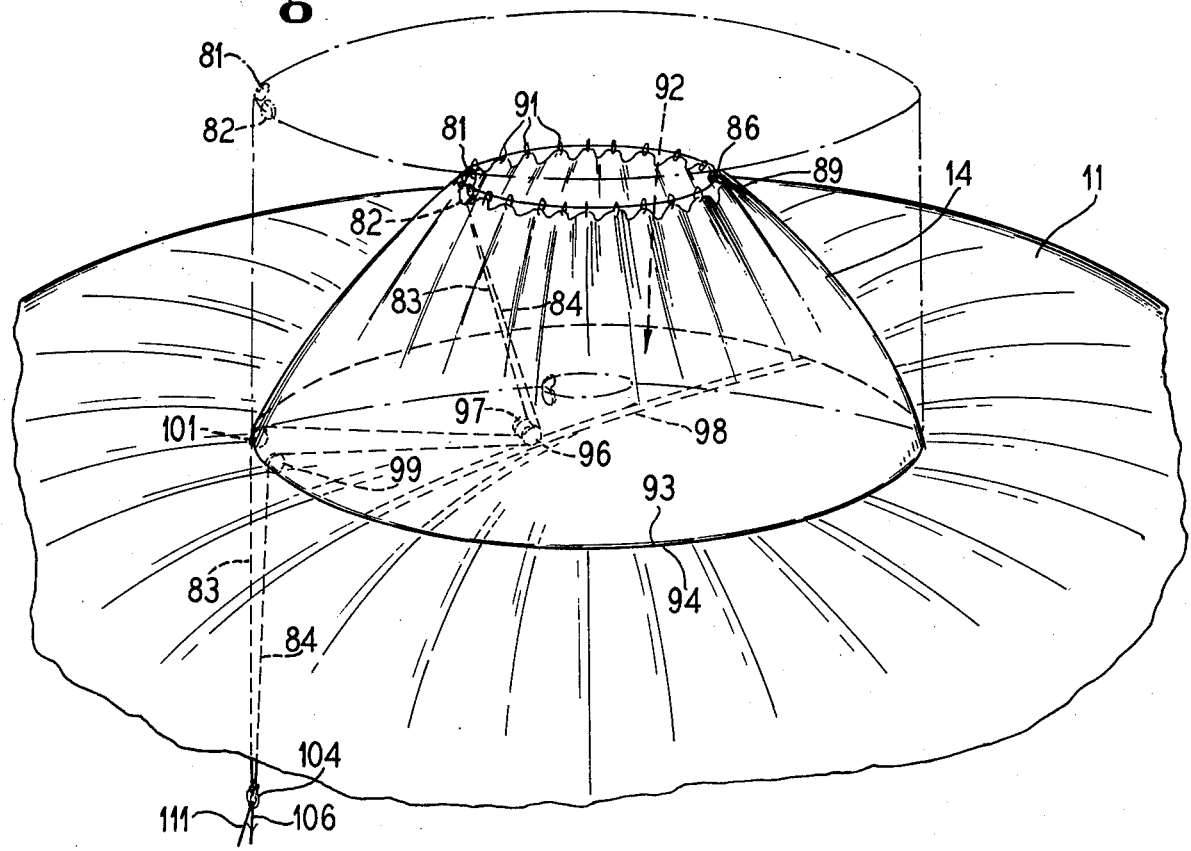
FIG. 3 is an enlarged partial perspective view of the deflation port of the invention.

FIGS. 3 through 6 illustrate in detail the structure for the deflation port 14 and as shown in FIG. 3 the material of the deflation port 92 can be adjusted from a completely closed position wherein its surface conforms to the contour of the balloon envelope to a complete opened position illustrated in dash dot line in FIG. 3 wherein the upper deflation port panel forms a cylinder through which the hot air of the balloon can escape. Furthermore, as shown in solid line in FIG. 3, the deflation panel 92 can be selectively opened or closed to an intermediate position.

The lower edge 93 of the deflation panel 92 is attached to the upper edge 94 of the balloon envelope 11 comprising a plurality of gores and a pair of pulleys 99 and 101 are attached as shown in FIG. 6 to webs 98 of the balloon where the upper edge 94 of the envelope meets the deflation panel 93. A ring 86 is firmly attached to a web 89 of the upper edge of the deflation panel 92 as illustrated in FIG. 4 and loops 87 and 88 are connected to ring 86 and flexible cords 84 and 83 extend from the ends 87 and 88 and pass through the rings 91 and over pulleys 81 and 82 which are attached to the upper end 90 of the deflation panel 92. The cords 83 and 84 pass over additional pulleys 96 and 97 attached to the webbing 98 as illustrated in FIG. 6 and then over pulleys 99 and 101 attached to the balloon envelope webbing 98 at the junction between the lower edge 93 of the deflation panel 92 and the upper portion 94 of the balloon envelope. The lower ends of the cords 83 and 84 are connected by a pin 100 to a ring 104. A pair of cords 111 and 106 are attached to the ring 104 and pass through a guide ring 107. The lower end of cord 111 is formed with a ring 112 which fits about a pin 114 having an opening 119 through which a removable locking pin 121 can be received. The pin 114 passes through openings in a U-bolt 113 and has a head 116 attached to a cord 117 that is attached to a ring 118 connected to the balloon at a suitable location where it can be reached by occupants in the balloon. The ring 113 is connected by cord 120 to the ring 118 and the locking pin 121 is secured by a cord 122 to the ring 114.

The cord 106 passes through the loop 107 and is connected to a ring 108 which is connected to a line 109 suitably attached to the balloon basket so as to allow the deflation port 14 to be manually opened or closed by the operators of the balloon. The line 109 is attached to the basket at a suitable location wherein it can be easily reached by the operators of the balloon.

In operation, the deflation port 14 is closed during inflation and normal operation of the balloon by drawing the lines 83 and 84 taut thus closing the upper end of the deflation panel by drawing the rings 91 close together thus providing substantial sealing of the upper end of the envelope.

The deflation port operates in the following manner. For inflation the lines 106 and 111 are secured respectively to the basket of the balloon with the pin 114 in position holding the ring 112 and the locking clamp 121 in the opening 119. Under these conditions, the lines 83 and 84 are taut and the upper end of the deflation port is substantially closed. Then the balloon is inflated in the normal manner and flown as desired. When the operator desires to open the deflation port either after landing or perhaps under certain conditions while in flight the pin 114 is withdrawn from the member 113 after removing the clamp 121 so as to allow the inflation port to open by allowing the lines 83 and 84 to move upwardly thus allowing the rings 91 to spread apart thus opening the upper end of the deflation port. If for some reason the deflaton port is opened in flight and it is desired to reclose it the operator can obtain line 109 and pull it downwardly thus moving member 104 and lines 83 and 84 downwardly relative to FIG. 4 thus reclosing the deflation port. Thus, the present invention comprises a deflation port that can be selectively closed or opened either automatically by withdrawing the pin 114 from the member 113 which will open the port and can be manually closed by drawing on the line 109. The port can also be held at varying positions between open and closed as illustrated in FIG. 3 by adjustment of the line 109 so as to adjust the lines 83 and 84 relative to the rings 91. Also, since the line 109 is always secured to the basket of the balloon, the balloon cannot be accidentally deflated even in the event the pin 114 is removed from the member 113 accidentally as the line 109 will still be secured or can be reached by the operator to maintain the port closed, partially opened or in any intermediate position.

Figure 7:
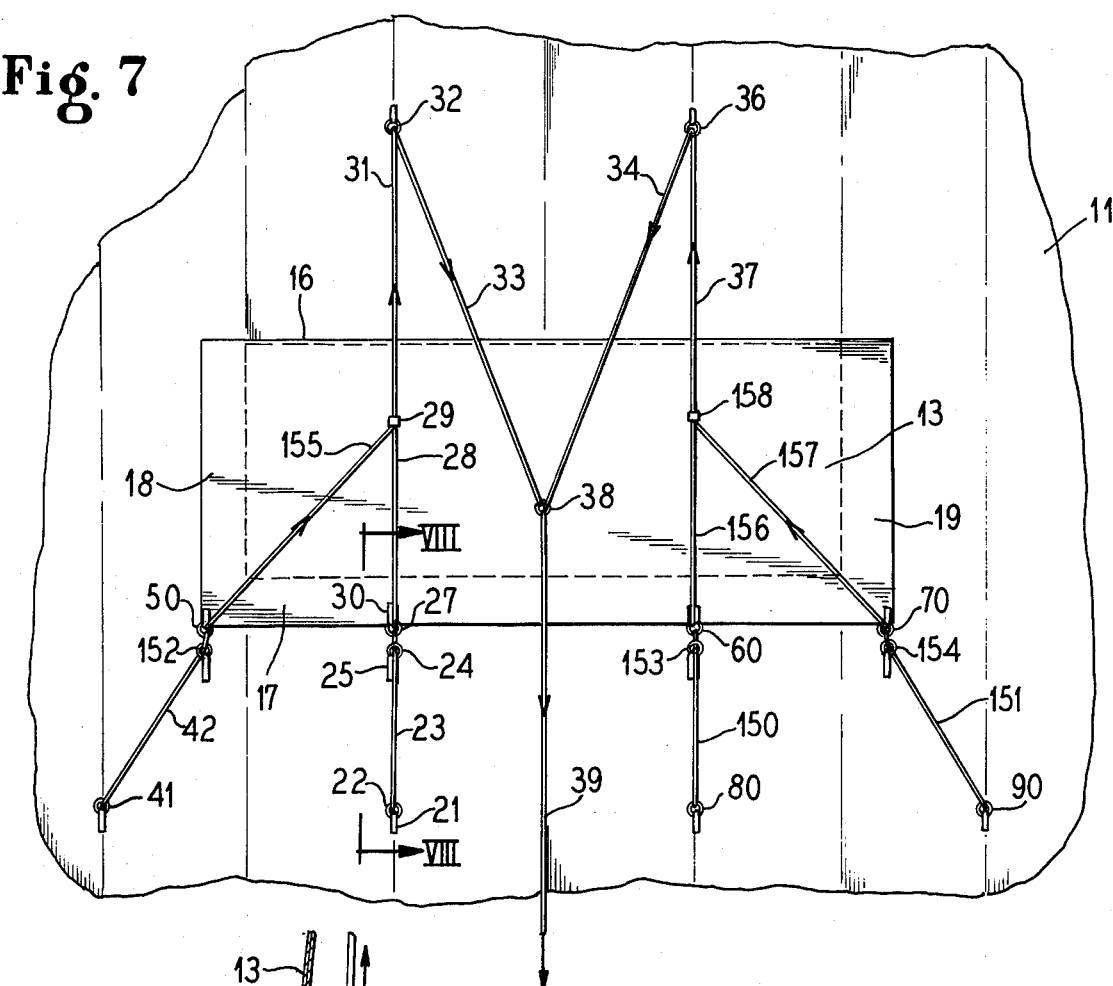
FIG. 7 is a perspective view of the deflation port of the invention.
Figure 8:
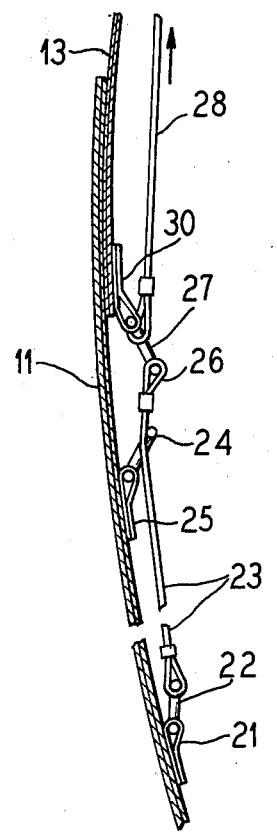
FIG. 8 is a detailed sectional view taken on line VIII—VIII from FIG. 7.

The maneuvering port of the invention is illustrated in FIGS. 7 and 8 and comprises a maneuvering panel 113 which has its upper edge 16 attached to the envelope 11 of the balloon and has overlapping side edges 18 and 19 and a lower overlapping edge 17 which overlaps an opening formed in the envelope of the balloon. The lower edge of the maneuvering panel 13 has rings 50, 27, 60 and 70 which are sewn as, for example, to webbing 30 as illustrated in FIG. 8 to the panel 13. Rings 41, 21, 80 and 90 are attached to the envelope 11 of the balloon beneath the maneuvering panel 13 and lines 42, 23, 150 and 151 are respectively connected to the rings 41, 22, 80 and 90 and respectively pass through rings 152, 24, 153 and 154 on the balloon envelope and connect to rings 50, 27, 60 and 70 attached to the lower edge 17 of the maneuvering panel 13. Each of the rings are attached to the maneuvering panel as, for example, by webbing 30 as illustrated in FIG. 8. The rings 50, 27, 60 and 70 are connected to lines 155 28, 156 and 157 and lines 155 and 28 are joined at point 29 and lines 156 and 157 are joined at point 158. Lines 31 and 37 extend from points 29 and 158 through rings 32 and 36 connected to the balloon envelope 11 and lines 37 join respectively with lines 33 and 34 which are connected to a ring 38. A line 39 leads from ring 38 to the balloon basket 12.

When the line 39 is secured, it is secured such that the panel 13 is closed and the confirmation of the envelope 11 with the lines 42, 23, 150 and 151 will hold the lower edge 17 of the maneuvering panel 13 against the balloon 11 thus maintaining the maneuvering port underneath the maneuvering panel 13 closed. When it is desired to open the maneuvering panel, the line 39 is pulled downwardly relative to FIG. 7, thus, deforming and moving the lower edge 17 of the panel 13 upwardly relative to FIG. 7 thus opening the port 13 to allow air to escape therefrom. As the line 39 is pulled downwardly, the rings 50, 30, 60 and 70 will pull upwardly on the lower edge of the panel 13 thus opening the port and allowing gases to escape to best the maneuver the balloon.

Thus, it is seen that the present invention provides novel deflation and maneuvering ports which can be selectively operated so as to either open or close or hold in intermediate positions as desired.

Although the invention has been described with respect to preferred embodiments, it is not to be so limited as changes and modifications may be made therein which are within the full intended scope as defined by the appended claims.

I claim as my invention:

1. A balloon having an envelope and a basket with a deflation port formed in said envelope comprising an opening formed in said envelope, a deflation panel attached to said envelope to cover said opening, a line attached to said deflation panel and extending to said basket so as to selectively allow said deflation panel to move relative to said opening to cover it by varying amounts, wherein said opening in said envelope is circular and is formed in an upper portion thereof, wherein said deflation panel is cylindrical in shape and has its lower edge connected to said envelope about said opening and said line is engageable with the upper edge of said cylindrical deflation panel and is arranged to open and close it, wherein said upper edge of said cylindrical deflation panel is formed with a plurality of spaced opening through which said line extends so as to open it and close it like a draw string, comprising a plurality of pulleys attached to said balloon so as to guide said line, wherein said plurality of spaced openings are formed by rings attached about said upper edge of said cylindrical deflation panel, and wherein a holding member is connected to said line and second and third lines extending downwardly from said holding member such that said second line is attached to said balloon where it is available for manual operation, and an automatic disconnect connected to said third line and operable from said basket.

2. A balloon according to claim 1 wherein said automatic disconnect comprises a pull pin for releasing said third line.

3. A balloon having an envelope and a basket with a deflation port formed in said envelope comprising a circular opening formed in the upper portion of said envelope, a deflation panel of generally cylindrical shape with its lower edge attached to said envelope about said circular opening, a plurality of first rings attached to said deflation panel about its upper edge, a second ring firmly attached to said deflation panel, first and second flexible cords with first ends attached to said second ring and extending in opposite direction through said plurality of first rings to the side of said opening opposite said second ring, a pair of pulleys attached to said deflation panel at the upper edge thereof, opposite said second ring and said first and second flexible cords passing therethrough, means joining the second ends of said first and second flexible cords below said pair of pulleys, and a third cord with a first end attached to said means joining said first and second flexible cords and extending down to said basket, and means for detachable connecting the second end of said third cord to said basket.

* * * * *